United States Patent [19]

Tavano

[11] Patent Number: 4,651,952
[45] Date of Patent: Mar. 24, 1987

[54] EMERGENCY AIRCRAFT SYSTEM

[76] Inventor: John B. Tavano, 28 Edgewood Dr., Torrington, Conn. 06790

[21] Appl. No.: 820,516

[22] Filed: Jan. 17, 1986

[51] Int. Cl.⁴ .............................................. B64D 25/08
[52] U.S. Cl. ........................................ 244/2; 244/55; 244/135 R; 244/135 B; 244/129.2; 244/140
[58] Field of Search ................ 244/54, 55, 118.2, 120, 244/129.2, 135 R, 135 B, 138 R, 139, 140, 2

[56] References Cited

U.S. PATENT DOCUMENTS

| 2,577,058 | 12/1951 | Willis | 244/54 |
|---|---|---|---|
| 2,657,884 | 11/1953 | Merrill | 244/135 B |
| 3,006,576 | 10/1961 | Elijah | 244/2 |
| 3,227,399 | 1/1966 | Dastoli et al. | 244/140 |
| 3,298,633 | 1/1967 | Dastoli et al. | 244/2 |
| 3,388,746 | 6/1968 | Lindberg | 244/129.2 |
| 3,999,728 | 12/1976 | Zimmer | 244/2 |
| 4,426,050 | 1/1984 | Long | 244/140 |

Primary Examiner—Galen Barefoot
Assistant Examiner—Rodney Corl
Attorney, Agent, or Firm—McCormick, Paulding & Huber

[57] ABSTRACT

A turbojet aircraft has a fuselage pod in which all fuel is stored for engines also linked to the pod. The pod and engines can be jettisoned in flight to improve aircraft performance in the event of a forced landing.

10 Claims, 13 Drawing Figures

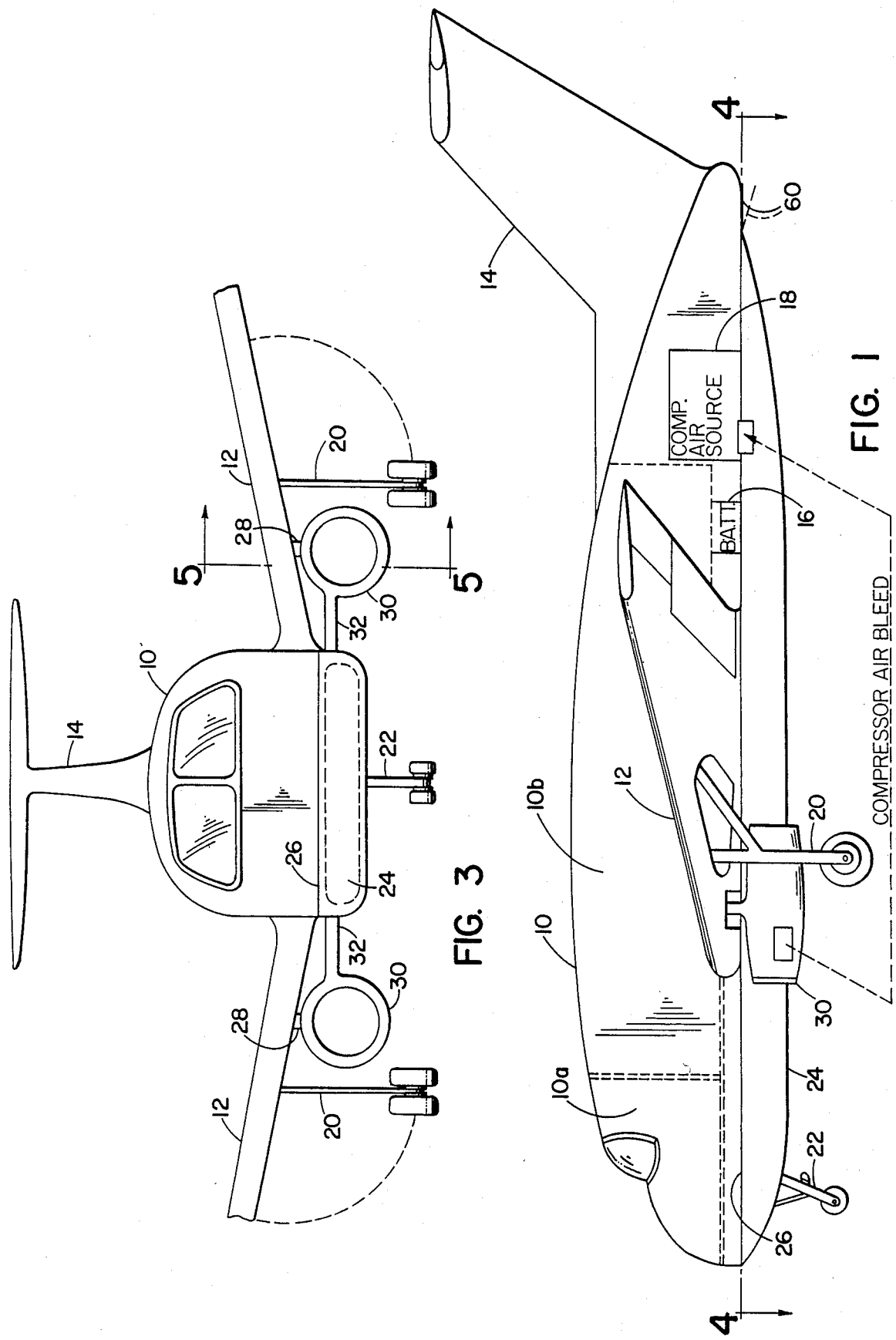

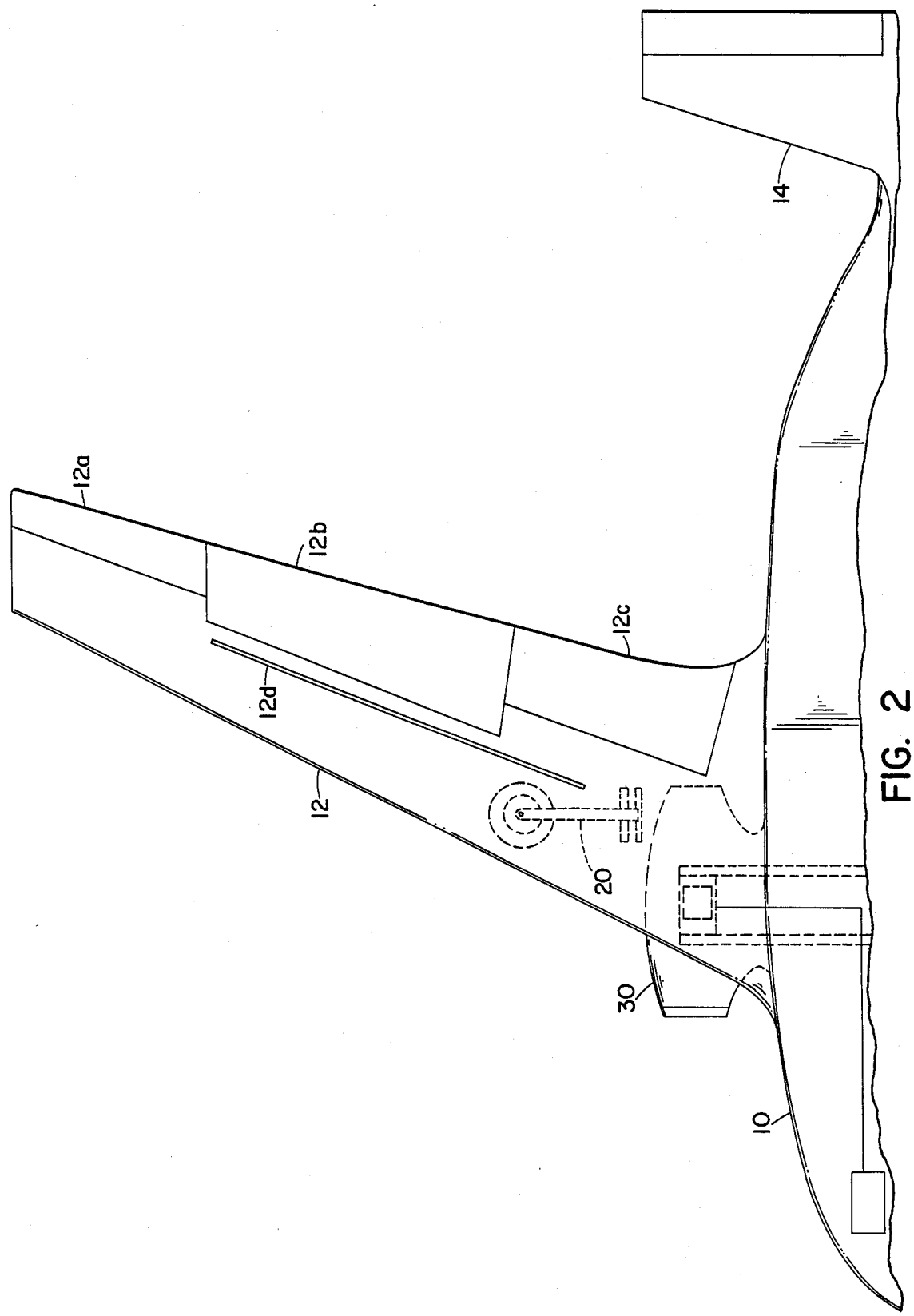

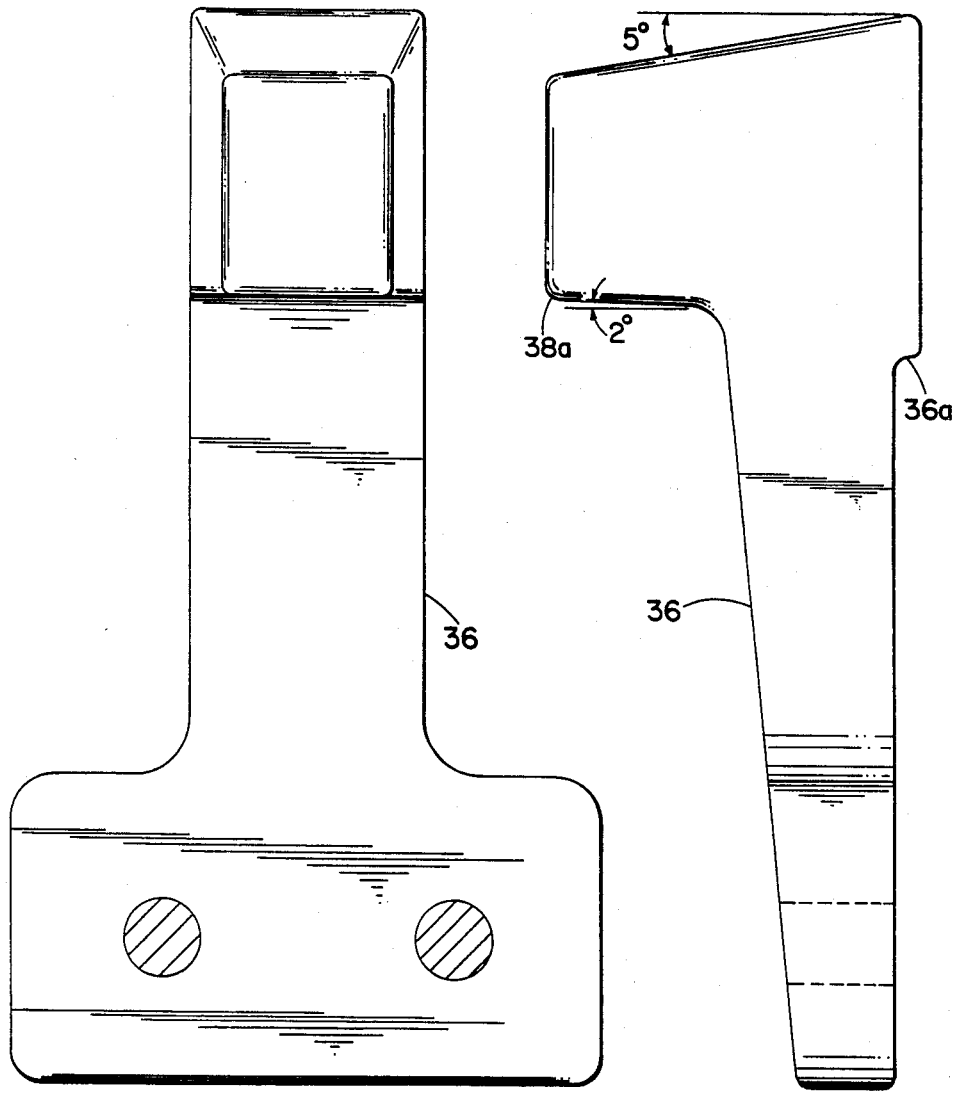

EMERGENCY AIRCRAFT SYSTEM

This invention relates generally to aircraft systems to faciliate continued flight in the event of emergencies, and deals more particularly with an aircraft capable of power off emergency flight wherein the engines and fuel can be conveniently jettisoned so that the aircraft is capable of continued flight in an emergency flight mode.

In accordance with the presently preferred embodiment of the present invention a turbojet aircraft has a fuselage with cockpit and passenger compartments in a primary fuselage structure, and wings are carried by this primary fuselage structure as is the empennage. The engines are detachably secured to the underside of the wings and to a lower fuselage pod structure that cooperates with the main fuselage structure to define a streamlined fuselage shape well suited for normal powered flight. The interface between the fuselage and pod includes at least four releasable connecting or coupling structures such that the pod and engine nacelles can be released in flight. The main fuselage structure is capable of power off emergency flight after the pod and engines have been jettisoned. Fuel is carried in individual fuel tanks arranged in series within the fuselage pod and means is provided for isolating each individual tank in the event of an emergency. Fire extinguishing means is provided within each individual tank compartment or cage and may be actuated automatically or manually in the event of fire, with each tank also being individually isolated as a result of fuel tank shut-off valves provided between adjacent tanks.

Means is provided for assuring control of the aircraft during power off emergency flight operations. Means is provided for storing compressed air in the main fuselage portion, during normal flight, by compressor air bleed from the jet engines. This air pressure source is available for operating control surfaces for power-off flight. Electrical power is provided in the main fuselage structure from a conventional battery also provided in the fuselage. Release of the fuselage pod can be accomplished from the cockpit by mechanical means, with coupling means provided between the fuselage and pod. A fuselage mounted housing defines a rearwardly open socket and the fuselage pod defines a forwardly projecting tapered lug that is receivable in the socket. A rotatably mounted latch or lever is provided on the housing and is movable from a latched position where the bracket is secured to the housing to a released position where the bracket is free to move rearwardly relative the housing. Thus, in the event of an emergency, and when the aircraft assumes a nose down attitude spoilers or the like in the wing maybe utilized to the slow the aircraft down in order to faciliate separation of the fuselage pod and engines from the aircraft. The relatively heavy fuel filled fuselage pod and associated engines will fall away from the aircraft as a result of which the pilot will have a very light weight aircraft well adapted for power off emergency flight.

FIG. 1 is an elevational view of an aircraft constructed in accordance with the present invention.

FIG. 2 is a top plan view of the right hand portion of the aircraft shown in FIG. 1, the left-hand portion being similar thereto.

FIG. 3 is a front elevational view of the aircraft illustrated in FIGS. 1 and 2.

FIG. 10 is a view of the bracket illustrated in FIG. 5.

FIG. 11 is a side elevational view of this bracket as it appears in FIG. 5.

Figure 4:
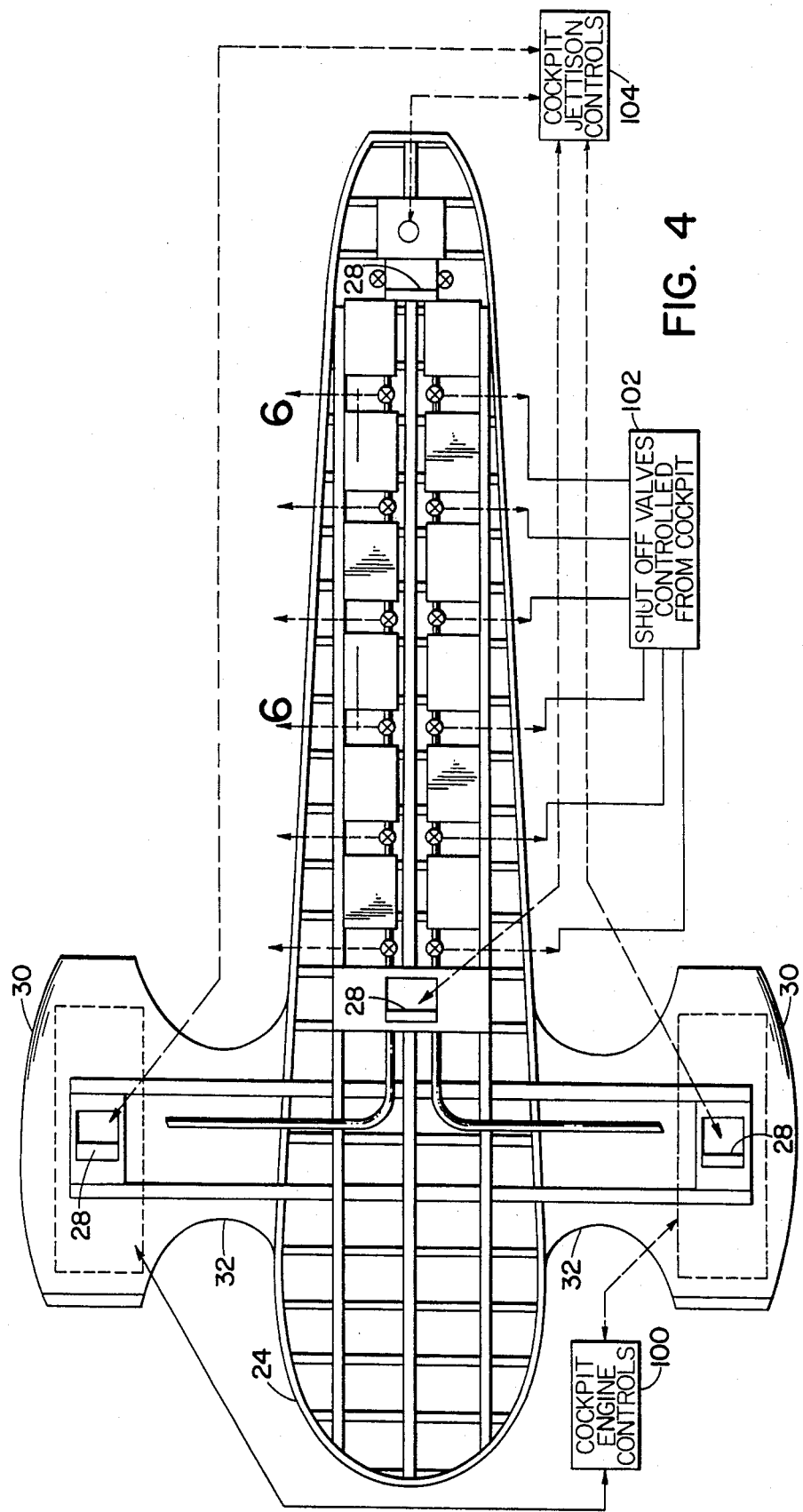
FIG. 4 is a horizontal sectional view taken generally on the line 4—4 of FIG. 1.

Present day turbojet aircraft equipped to carry passengers and/or cargo necessarily include relatively heavy engines, and generally require rather large fuel loads for these engines. When an emergency situation arises in flight that cannot be corrected by the crew the plane will fly only poorly with this weight of engines and fuel causing present day aircraft to crash unnecessarily at relatively high speeds and in remote locations not suited to such crash landings.

The system disclosed herein will enable the crew to release the relative heavy engines and associated fuel from the aircraft while it is still flyable, and give the pilot time to land the lightened aircraft structure that results in a free flight or power-off emergency mode of operation. When the pilot is able to release the engines and fuel from his aircraft the loss of weight will give the aircraft additional lift so as to permit gliding greater distances from the point at which the emergency arises, and will also permit the aircraft to land at greatly reduced landing speeds.

Considering first the embodiment illustrated in FIG. 1, an aircraft is shown having a main fuselage portion 10 to which is attached wings 12 and empennage or tail section 14. The fuselage 10 includes a cockpit portion 10a and passenger compartment 10b and it is a feature of the present invention that this main fuselage portion also includes the aircraft's battery 16 and a source or storage compartment for compressed air 18. As best shown in FIG. 2 symmetrically arranged wings 12, 12 are provided one on either side of the fuselage 10 and each wing includes conventional control surfaces in the form of ailerons 12a and landing flaps 12b, 12c. In addition, spoilers 12d may be provided for turning at speeds where the ailerons 12a are less efficient, and in addition the spoilers 12d serve to decelerate the aircraft for reasons to be discussed in greater detail hereinafter. Not shown, but also within the scope of the present invention the wing 12 also includes leading edge slots. Finally, a retractable main gear assembly 20 is provided in the underside of each wing. FIG. 2 illustrating the gear in its retracted condition and FIG. 1 illustrates the main gear 20 in its extended position. A nose gear 22 may be provided but it is noted that the nose gear is not located in the main fuselage portion 10, but rather is located in an elongated fuselage pod 24 to be described.

As best shown in FIG. 3 the fuselage pod 24 is connected to and normally permanently assembled with the main fuselage 10 to cooperate therewith and define a streamline fuselage shape for normal flight. The fuselage 10 and pod 24 define an interface or surface 26 therebetween and FIG. 4 illustrates in plan view the configuration for the fuselage pod 24 at this interface. As there shown four connections or couplings 28, 28 are provided to secure the lower fuselage pod 24 to the main fuselage 10. One such coupling means is illustrated in greater detail in FIG. 5, being the coupling provided between one engine nacelle 30 and the wing 12.

Figure 5:
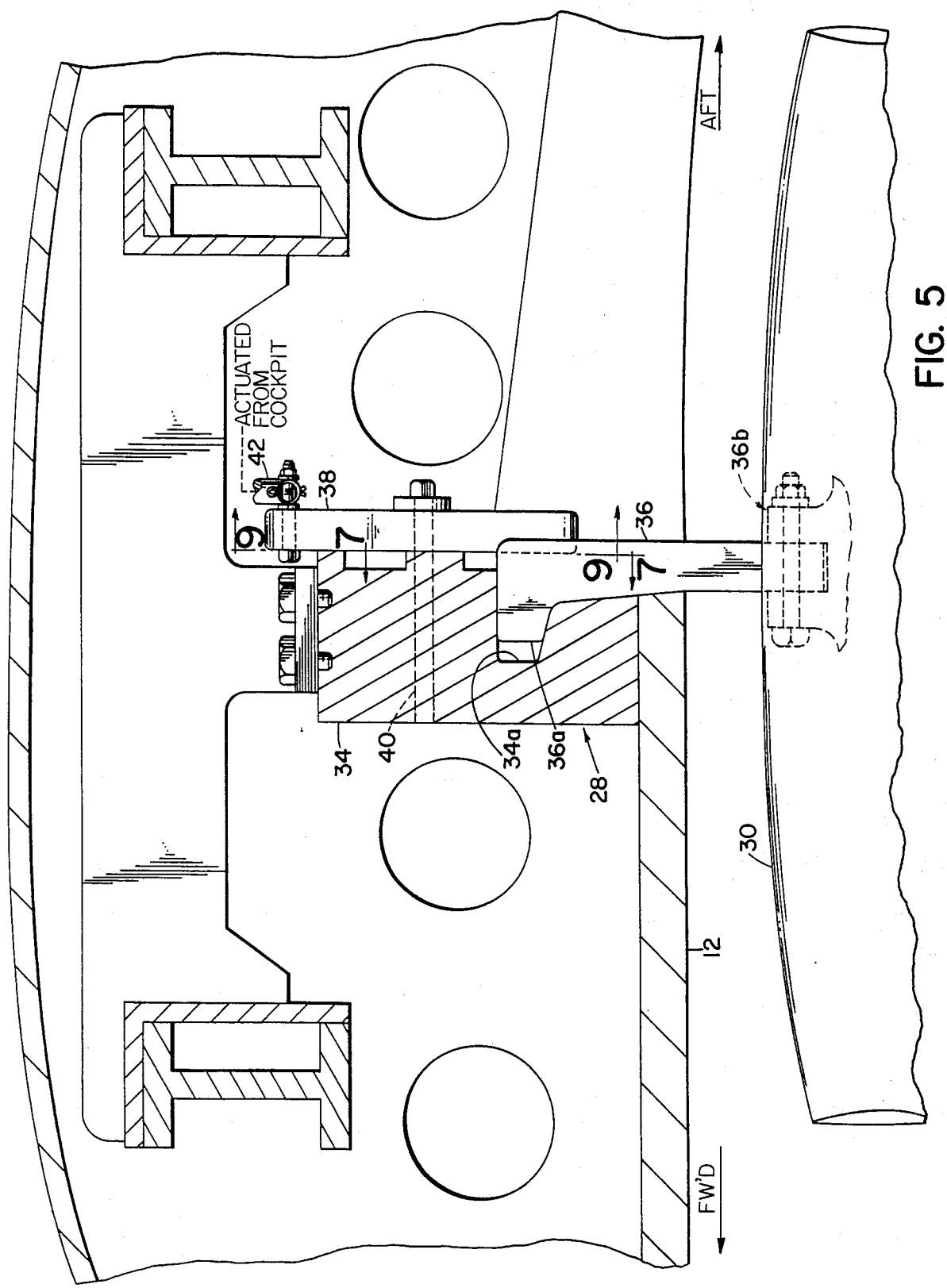
FIG. 5 is a sectional view taken generally on the line 5—5 of FIG. 3.

In the aircraft shown two engines 30, 30 are provided on stub wings 32, 32 each of which stub wings serves to permanently connect the engine nacelle to the fuselage pod 24 and to carry fuel lines to the engine. As shown in FIG. 5 each engine or nacelle 30 is also connected to the wing structure 12 by mechanical coupling means, indicated generally at 28 in this view. In accordance with the present invention each mechanical coupling means includes a wing mounted housing member 34 defining a rearwardly open tapered socket 34a which socket is adapted to receive a lug 36a integrally formed in a bracket 36. The bracket 36 is permanently secured to the engine nacelle, as indicated generally at 36b. A rotatably mounted latch/lever 38 is provided to secure the bracket 36 in assembled or coupled relationship to the housing 34 and this lever/latch is adapted to pivot on shaft 40 so as to permit the engine nacelle to be disconnected from the wing. Rotating lever/latch 38 from the position shown, where it serves to secure bracket 36 to housing 34, to a released position (not shown) is accomplished by push rod member 42. Member 42 may be operated by a fluid actuator from the cockpit, or alternatively and/or redundantly manual actuation of the lever/latch 38 may be accomplished from the cockpit through a mechanical push rod linkage.

Figure 7:
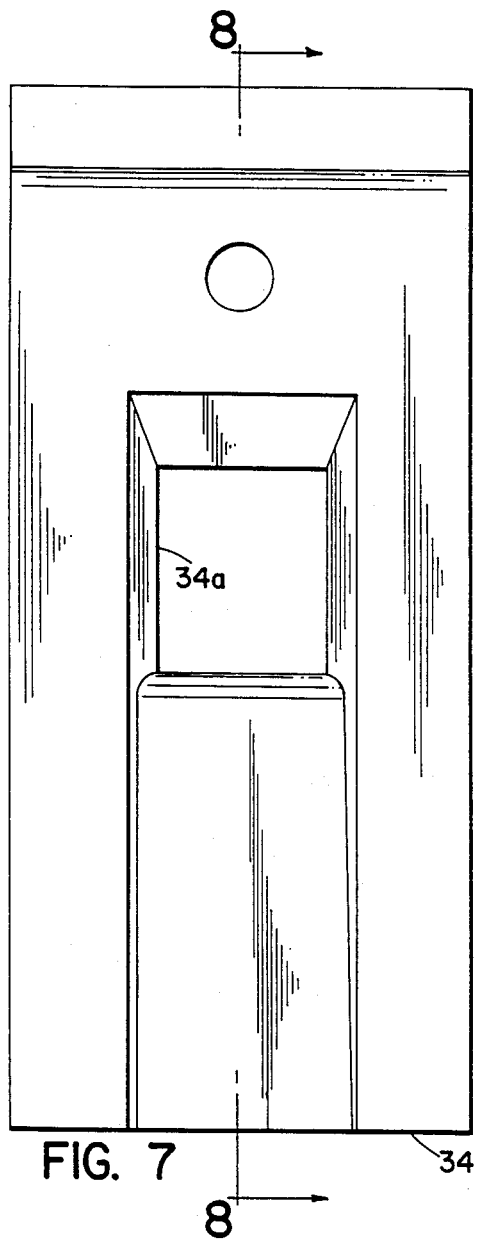
FIG. 7 is a view taken generally on the line 7—7 of FIG. 5 illustrating the housing portion of the fuselage mounted mechanical coupling means between the wing and engine or engine nacells.
Figure 8:
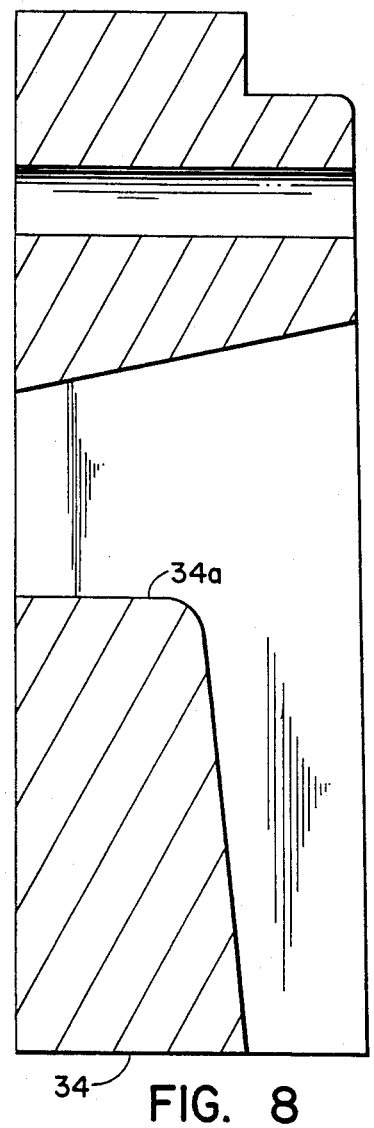
FIG. 8 is a sectional view taken generally on the line 8—8 of FIG. 7.
Figures 9, 13:
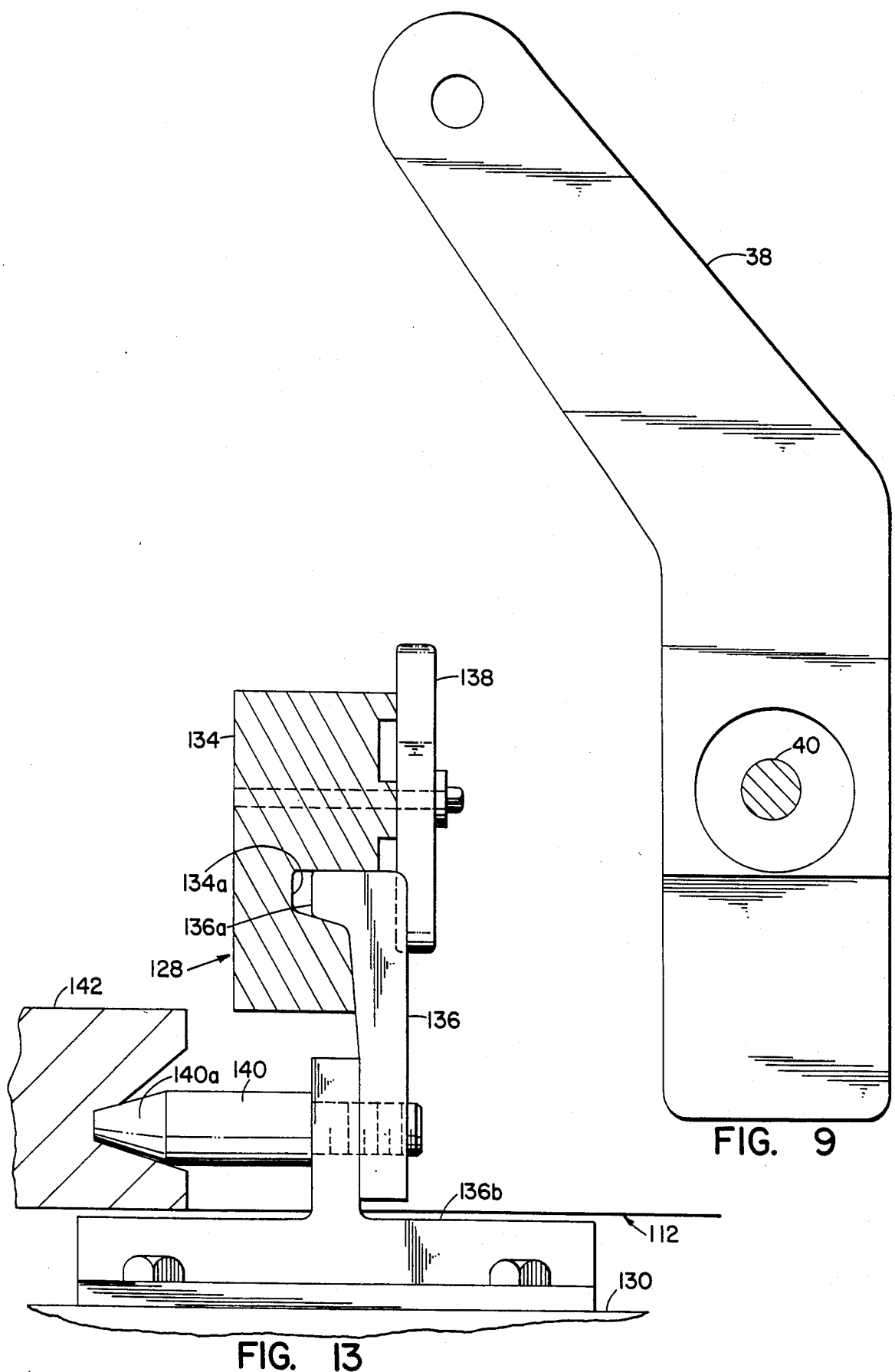
FIG. 9 is a detailed view of the crank arm provided to assure latching of the housing and bracket members of FIG. 5.
FIG. 13 is a view similar to FIG. 5 but showing an alternative embodiment for the coupling means.

Similar mechanical coupling means 28, 28 are provided to secure the fuselage pod 24 to the main fuselage structure 10 and each of these coupling means comprises a fuselage mounted housing defining a rearwardly open socket adapted to receive a bracket lug such as that referred to previously with reference to FIG. 5. The lug portion of the bracket is preferably tapered as illustrated in FIGS. 9 and 10 with a five degree taper being provided on at least the top side of the lug and a lesser taper of approximately two degrees on the lower face of the lug. As shown in FIG. 10 the lower portion of bracket 36 is adapted to receive screws for securing the bracket to the engine housing or nacelle 30. Lug portion 38a is shaped so as to having a generally rectangular configuration adapted to be received in the socket complementary shaped defining portion 34a of the housing shown in FIGS. 7 and 8. This housing is provided in the fuselage 10 or wing 12 and each of the brackets 36 are provided on either the fuselage pod 24 or engine nacelle 30. FIG. 9 shows the latch/lever 38 with its pivot shaft 40 and free end portion adapted for connection to the actuating linkage or mechanism as described previously. End portion 38a of latch 38 is adapted to engage the rear face of bracket 36 as shown at 36a to secure the bracket in place in its associated housing 34.

FIG. 13 shows an alternative coupling means 128 for securing an engine nacelle 130 to the aircraft structure, in this case to wing structure 112. A wing mounted housing 134 defines a rearwardly open socket 134a that receives the lug 136a of bracket 136. Rotatable latch 138 provides the latch to hold these members in the assembled relationship shown. A forwardly projecting pin 140 is threaded into the bracket 136 and extends through an aligned opening in the engine nacelle frame 136b. The forward end of pin 140 defines a tapered nose 140a which fits into a socket defined for it in block 142. This block is permanently provided in wing 112, and cooperates with the pin 140 to help support the engine nacelle in normal flight. When jettisoned this nacelle 130 will separate from the wing just as described above with reference to nacelle 30 in FIG. 5.

Figure 6:
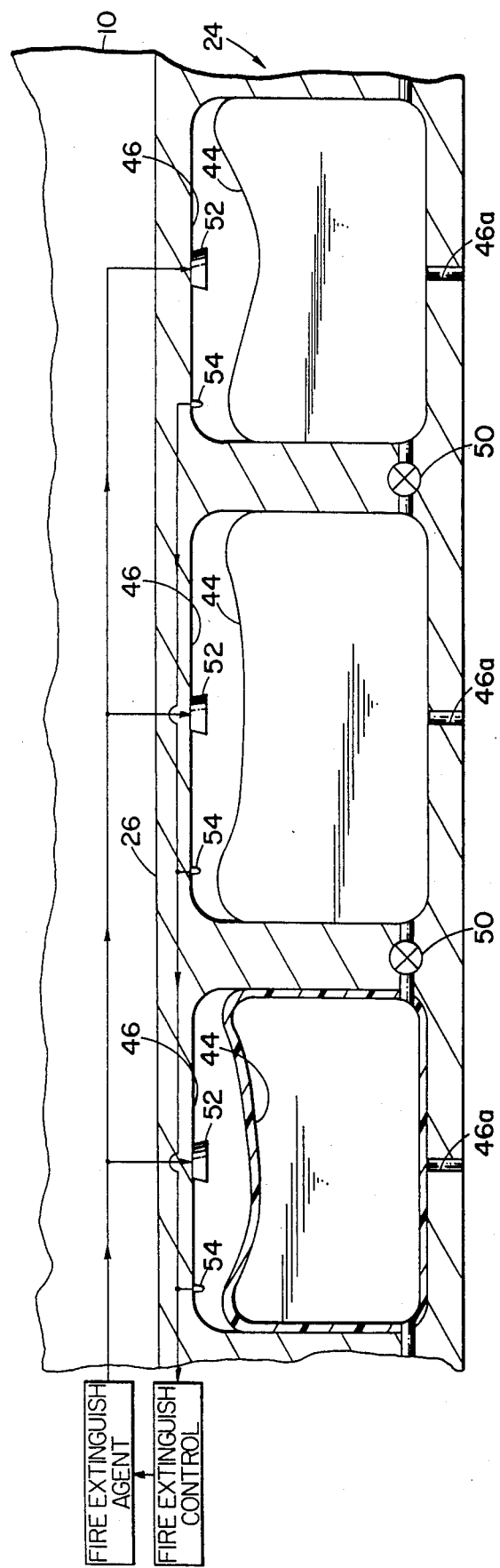
FIG. 6 is a section view taken generally on the line 6—6 of FIG. 4.

Turning now to a more detailed description of the fuel system incorporated in the fuselage pod 24, FIG. 6 illustrates three adjacent individual fuel tanks and each of these fuel tanks comprises a collapsible bladder 44, which bladder is supported in a cage structure 46 that is specifically designed for this purpose. The cage 46 may include a lower wall having a drain opening 46a such that any leak developed in the bladder 44 will permit excess fuel to drain overboard. In such event fuel shut-off valves 50 provided between adjacent fuel tanks as shown allow the crew to isolate any fuel tank where any such leak develops. These valves are preferably mechanically opearable in the event of emergency.

A further feature of the present invention is provision of fire extinguishing discharge nozzles 52 in each fuel tank cage which discharge nozzles are operated under the control of a fire extinguishing control circuit that includes temperature sensors or smoke detectors of the type indicated generally at 54 in each of these individual fuel tank cages. The control circuitry for the fire extinguishing system includes provision within the cockpit for manual release of the fire extinguishing agent in the event of malfunction in the detection system of the automatic detection system. It will be apparent from FIG. 4 that the individual fuel tanks are connected in at least two strings or series associated with each of the two engines. Fuel shut-off valves are located between adjacent fuel tanks in each string.

Figure 12:
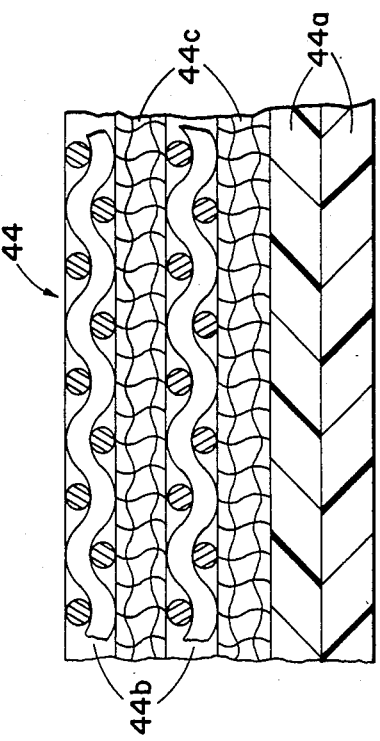
FIG. 12 is a detailed sectional view through the fuel bladder material showing its composite construction.

FIG. 12 shows, in cross section, the composite structure of bladder 44. The inside layer, or layers, 44a are of elastomeric material such as neoprene or the like. The outermost layer 44b is of flexible stainless steel mesh with quarter inch spacing between the wires. FIG. 12 also shows another layer 44b of stainless steel mesh sandwiched between the layers 44c, 44c of fire retardant material.

Finally, and still with reference to the fuel system, the cage structure 46 is preferably fabricated from aluminum so that the cage structure will not penetrate the stainless steel mesh reinforced fuel bladder in the event of a crash landing or the like. Thus, the cage structure is yieldable to protect the many individual fuel tanks. Each tank is collapsible so that as fuel is used in flight inert air will fill the space between the cage and the bladder. This reduces the chance of explosion and fire normally associated with partially filled fuel tanks on present day aircraft. The many small fuel tanks also helps to reduce the hazard of explosion such as is likely to be presented when a large fuel tank develops an explosive mixture due to the large confined space in a partially full tank.

Still with reference to FIG. 4 the controls for each of the two nacelle mounted engines are provided in the cockpit as indicated generally at 100. The shut-off valves provided between each of the individual fuel tanks 50, 50 are also controlled from the cockpit as indicated generally at 102. Finally, the controls for jettisoning the fuselage pod and engines also includes provision for actuating these mechanical coupling means from the cockpit as indicated generally at 104 in FIG. 4.

As best shown in FIG. 3 the two engine nacelles 30, 30 are supported both from the fuselage pod 24 by stub wings 32, and also are supported by the coupling means 28, 28 provided for this purpose in vertically extending struts extending between the underside of the wings 12 and the engine nacelles 30.

If an emergency arises in flight that the crew cannot control so as to permit continuing the flight to a suitable landing at a suitable airport, the crew can isolate the fuselage from the fuel and engines (whether or not the emergency is related to these systems). After jettisoning the fuselage pod 24 and engines 30, 30 the pilot can control his aircraft even at very low airspeeds. His glide angle will also improve due to the reduction in weight achieved. If fuel is carried in the wings this can be conventionally dumped also. However, I prefer to carry all fuel in the pod 24. On landing the nose gear is gone but the weight distribution will allow the pilot to touch down in a nose high attitude that allows for use of tail skid 60 to provide support for the aircraft on the ground. This feature faciliates evacuation of the aircraft through a rear door (not shown) or doors which are closer to the ground than would be the case normally.

In an emergency immediately after take off, when the pilot may not have time to jettison the pod and the engines as outlined in the preceding paragraph, the present invention provides another alternative. In such a case the pilot can simply shut off all fuel valves from the cockpit as suggested at 102 in FIG. 4.

I claim:

1. An aircraft capable of power off emergency flight and comprising
   (a) a fuselage having a cockpit, a compartment for passengers and cargo, and fluid pressure storage means in said fuselage,
   (b) wings attached at inner ends to said fuselage, said wings having control surfaces provided thereon, and said control surfaces including aircraft decelerating devices,
   (c) a lower fuselage pod structure cooperating with said fuselage to define a streamlined fuselage shape for normal flight, said fuselage and fuselage pod defining an interface therebetween,
   (d) a plurality of individual fuel tanks in said lower fuselage pod, each fuel tank having a fuel shut-off valve, and means for controlling said fuel shut-off valves from the cockpit,
   (e) at least two aircraft engines mounted to said fuselage pod structure, fuel lines between said engines and said fuel tanks, engine controls provided in said cockpit, means connecting said engines to said wings, engine control lines for interconnecting said cockpit engine controls with said engines, and coupling means for said engine control lines, said coupling means provided adjacent said means connecting said engines to said wings,
   (f) means connecting said fuselage pod to said fuselage, and means for disconnecting both said connecting means at the cockpit,
   (g) at least one engine having an engine accessory capable of pressurizing a fluid, and fluid conduit means connecting said accessory with said fluid pressure storage means in said fuselage, and coupling means for said fluid conduit means, said coupling means provided adjacent the interface between said fuselage and said fuselage pod structure.

2. The apparatus of claim 1 wherein said means connecting said fuselage pod to said fuselage comprises at least two mechanical coupling means, each coupling means comprising a fuselage mounted housing defining a rearwardly open socket, a pod mounted bracket defining a forwardly projecting tapered lug portion adapted to be received in said socket, and a rotatably mounted latch/lever provided in said housing and movable from a latched position wherein said bracket is secured to said housing and a released position wherein said bracket is free to move rearwardly relative said housing, all of said latch/levers being operable remotely from the aircraft cockpit.

3. The apparatus of claim 1 wherein each said individual fuel tank comprises a collapsible bladder, and a support cage for the bladder such that the bladder is supported when full of fuel, said bladder being resiliently deformable so as to collapse as the fuel is withdrawn.

4. The apparatus of claim 3 further characterized by a fire extinguishing system for said fuselage pod, said system including sensors for each fuel tank cage, fire extinguishing agent discharge nozzles for each cage, and means for controlling the discharge of such agent in response to the condition of said sensors.

5. The apparatus of claim 1 wherein at least some of said individual fuel tanks are series connected, fuel shut-off valves being located between adjacent fuel tanks so serially connected.

6. The apparatus of claim 1 further characterized by horizontally oriented stub wings connecting said engines to said fuselage pod, and vertically oriented struts connecting said engines to said wing.

7. The apparatus of claim 6 further characterized by connecting means in said vertically oriented struts for releasably securing said engines to said wings, said connecting means comprising mechanical coupling means, each coupling means comprising a wing mounted housing defining a rearwardly open socket, a engine mounted bracket defining a forwardly projecting tapered lug portion adapted to be received in said socket, and a rotatably mounted latch/lever provided in said housing and movable from a latched position wherein said bracket is secured to said housing and a released position wherein said bracket is free to move rearwardly relative said housing, all of said latch/levers being operable remotely from the aircraft cockpit.

8. The apparatus of claim 7 wherein said means connecting said fuselage pod to said fuselage comprises at least two mechanical coupling means, each coupling means comprising a fuselage mounted housing defining a rearwardly open socket, a pod mounted bracket defining a forwardly projecting tapered lug portion adapted to be received in said socket, and a rotatably mounted latch/lever provided in said housing and movable from a latched position wherein said bracket is secured to said housing and a released position wherein said bracket is free to move rearwardly relative said housing, all of said latch/levers being operable remotely from the aircraft cockpit.

9. The apparatus of claim 8 wherein each said individual fuel tank comprises a collapsible bladder, and a support cage for the bladder such that the bladder is supported when full of fuel, said bladder being resiliently deformable so as to collapse as the fuel is withdrawn.

10. The apparatus of claim 9 further characterized by a fire extinguishing system for said fuselage pod, said system including sensors for each fuel tank cage, fire extinguishing agent discharge nozzles for each cage, and means for controlling the discharge of such agent in response to the condition of said sensors.

* * * * *